United States Patent

Gwaldacz, Sr. et al.

[11] Patent Number: 4,530,180
[45] Date of Patent: Jul. 23, 1985

[54] JIG LURE

[76] Inventors: Leo E. Gwaldacz, Sr.; Leo E. Gwazdacz, Jr., both of P.O. Box 66, Salkum, Wash. 98582

[21] Appl. No.: 578,193

[22] Filed: Feb. 8, 1984

[51] Int. Cl.³ ............................................. A01K 85/00
[52] U.S. Cl. ................................. 43/42.28; 43/42.37; 43/42.53; 43/44.81
[58] Field of Search .............. 43/44.81, 42.28, 42.37, 43/42.53, 42.25; D22/27

[56] References Cited

U.S. PATENT DOCUMENTS

| | | | |
|---|---|---|---|
| 2,551,221 | 5/1951 | Pray | 43/42.53 |
| 2,589,007 | 3/1952 | Landon | 43/42.28 |
| 2,765,572 | 10/1956 | Woolfe | 43/44.81 |
| 3,012,358 | 12/1961 | Multanen | 43/42.28 |
| 3,079,723 | 3/1963 | Roes | 43/42.37 |
| 3,750,323 | 8/1973 | Weis | 43/44.81 |

Primary Examiner—Gene P. Crosby

[57] ABSTRACT

A bent shank hook has at least one solid element slipped onto the shank midsection by an aperture in the solid element. A doubly bent wire, threaded at it's bend with a pliable element, is threaded into the solid element aperture nearest the hook curve, and tensioned along the hook shank through the solid element aperture so that the pliable element is pulled against or partly into the aperture of the solid element. At it's free end, the wire is fixed to and pulls a metal bead against the right angle bend of the hook shank.

13 Claims, 5 Drawing Figures

JIG LURE

BACKGROUND OF THE INVENTION

1. Field of the Invention

This invention is in the field of artificial bait. More specifically, it is in the fields of fishing jig lure construction methods and fishing jigs constructed on or about the hook shank.

2. Prior Art

The prior art discloses many methods of glueing or tieing fishing yarn to a hook. The present invention differentiates by presenting a unique article of manufacture and method of securing the yarn or maribou to the hook so that it is simpler to attach and more reliant in use. Exotic glues or complex tieing or wrapping schemes are not used. Instead, the yarn or some other material which is pliable and attractive (in combination with other elements) to fish is forced into or against the body of the jig lure and held in place by a doubly bent wire. The wire secures the pliable material to the body of the jig lure and the wire is in turn secured by fixing it to a metal bead. The method of securing with wire insures that the manufacture is relatively simple and the structure is resilent enough to undergo hardy use. The method and means of securing the wire to the bead insures that the manufacture is simple and sturdy.

SUMMARY

A bent shank hook has fixed thereto at least one solid element, a pliable element and a metal bead. By means of an aperture therethrough, the solid element or elements are slipped onto the hook shank midsection over the barbed end of the hook. The solid element(s) must be pliable enough to bend over the curved portion of the hook or be short enough in length to do so. The pliable element is folded into the bent end of a doubly bent wire and the free ends of the doubly bent wire are in turn threaded through the solid element aperture so that the pliable element is pulled against or slightly within the solid element, and the solid element is pulled against the inside of the right angle bend in the hook shank. The free ends of the wire are then threaded through the aperture in a metal bead and fixed to the bead so that the bead is pulled against one side of the hook shank bend and the solid element is pulled against the other. In this manner, the pliable and solid elements and metal bead form a structure which is easily manufactured, resilient under the tension of the wire and is very hardy in use.

BRIEF DESCRIPTION

DETAILED DESCRIPTION

Figure 1:
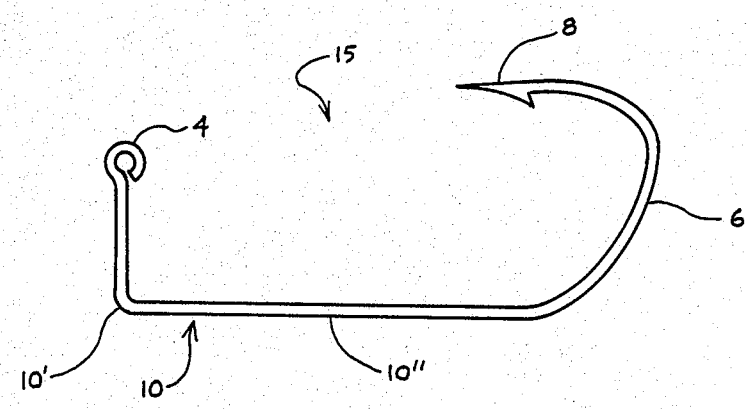
FIG. 1 shows a bent shank hook.

Referring to FIG. 1, a bent shank hook 15 is shown having an eyelet 4 and a curved end 6. The curved end 6 has a barb 8 and the eyelet 4 is at the end of shank 10 having a generally right angle bend 10' and shank midsection 10''.

Figure 2:
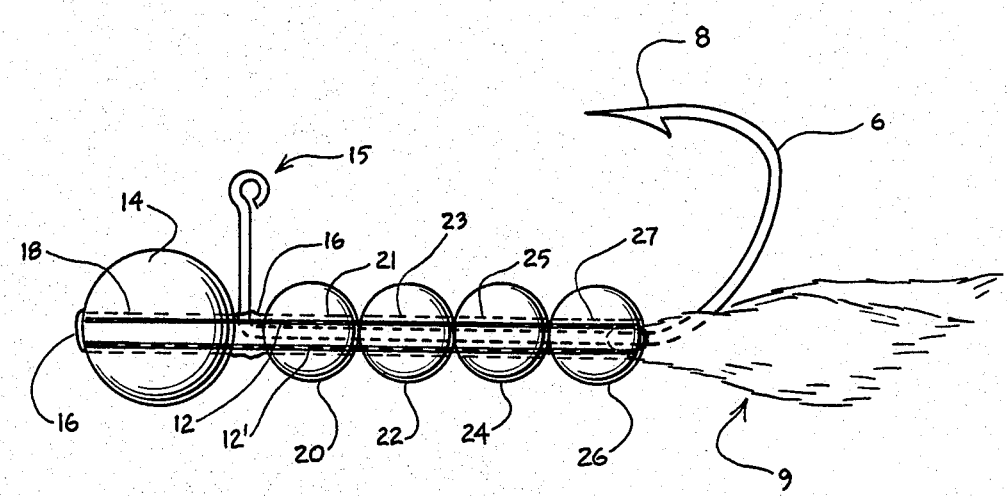
FIG. 2 is a side view of the preferred embodiment of this invention.
Figure 3:
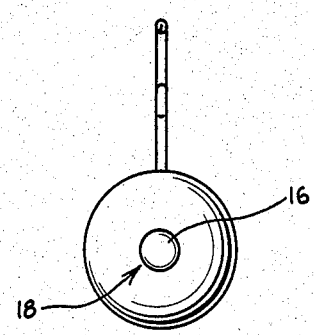
FIG. 3 is an end view of the preferred embodiment of this invention.

As shown in FIG. 2, beads 20, 22, 24 and 26 have been slipped over the curved end 6 of hook 15 through respective apertures 21, 23, 25 and 27 in each bead, and arranged along the hook midsection 10'' to abut the right angle bend 10' as shown in FIG. 1.

Figure 4:
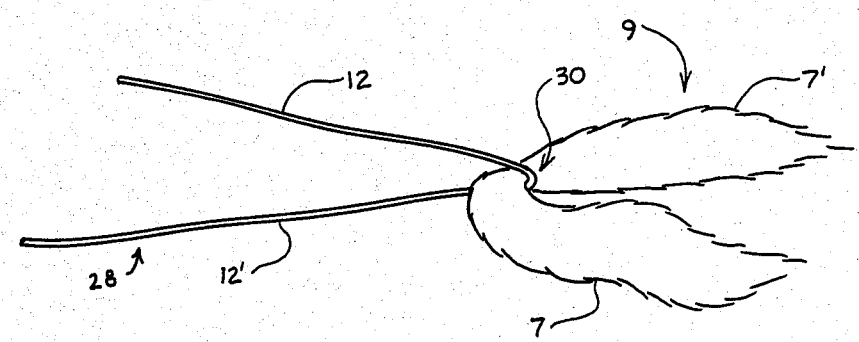
FIG. 4 shows the pliable element as it is threaded through the doubly bent wire.

A pliable element 9 such as fishing yarn or maribou or other material used in attracting fish is threaded through the bent end 30 of a doubly bent wire 28, as shown in FIG. 4, so that the pliable element 9 is folded into dual ends 7 and 7'. The free ends 12 and 12' of the doubly bent wire 28 are threaded through the apertures 21, 23, 25, and 27 along hook midsection 10'' and past hook bend 10'. A metal bead 14, preferably of brass and having an aperture 18, is positioned against the hook bend 10' so that the wire free ends 12 and 12' may be threaded through aperture 18 and fixed to the bead 14, preferably by means of solder 16. The solder 16 may also be applied to hook bend 10', as shown in FIG. 2, by heating bead 14 and wire ends 12 and 12' and letting the solder wick along the wire ends 12 and 12' and through aperture 18 to bend 10'. The pliable element 9 thereby abuts bead 26 or preferably is pulled to a slight depth within the aperture 27 of bead 26 by the tensioning of wire 28 between the element 9 and the attachment of wire 28 to bead 14. To this end, the folded pliable element 9 should be of sufficient diameter, even when compressed, to prevent it from being drawn entirely into the aperture 27 alongside the shank midsection 10'', as shown in FIG. 2. Obviously, the size of pliable element 9 can be adjusted for different material types. The wire ends 12 and 12' may also be affixed by glue or the like to metal bead 14 and hook bend 10'.

Figure 5:
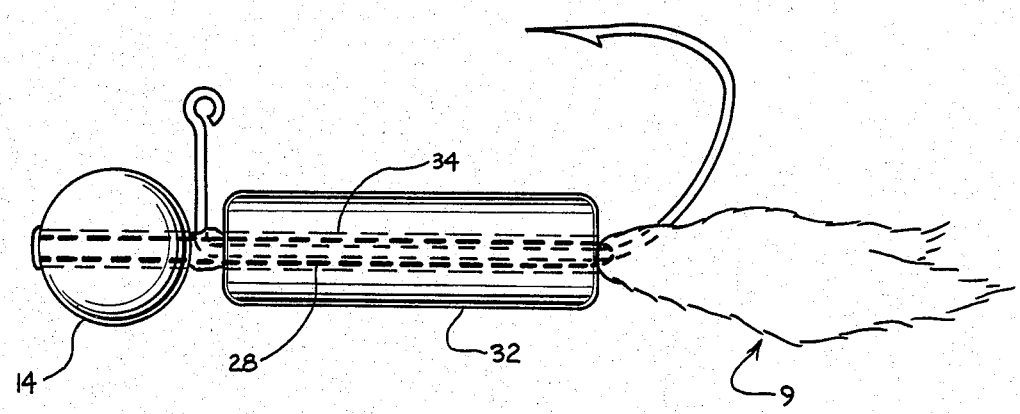
FIG. 5 shows an embodiment with only one solid element.

Additionally, as shown in FIG. 5, solid element 32 may substitute for the beads 20, 22, 24 and 26 to provide a means for mounting the element 9, wire 28 and bead 14 upon a bent shank hook 15. The pliable element 9 is in this embodiment abutted against aperture 34 of element 34 as the wire 28 is tensioned between the pliable element 9 and bead 14. In the previous embodiment, the pliable element 9 was drawn partly into the aperture 27 of bead 26. The requirement of element 32 is that it be either be small enough in length to slip over the curve 6 of hook 15 or pliable enough to do the same. Also, the element 32 and the elements 20, 22, 24 and 26 are preferrably of a flourescent or phosphorescent type of plastic.

Given the fact that a lure must have form to have function, the device of the present invention achieves it's form with a minimum of elements which are both easily secured and sturdy in use. The doubly bent wire 28 brings a resilient tension to the attachment of the pliable element 9. The metal bead 14 provides an easily applied means for attachment of the free ends 12 and 12' of the wire 28. The invention therefore derives function from both it's form and the unique methods and means to obtain the form.

It is anticipated that modifications and variations of the presently disclosed invention could be judged as equivalent and therefore covered by the nature and scope of the claims.

We claim:

1. A fishing jig comprising:
   a bent shank fish hook having a curved, barbed end, a straight shank midsection, a shank bend at generally right angles to said midsection and an eyelet terminus of said shank;

at least one solid element being an aperture therethrough with said solid element arranged on said shank midsection with said shank passing through the solid element aperture;

a metal bead, having an aperture therethrough, positioned abutting the shank bend with said metal bead aperture facing the hook midsection;

a wire, doubly bent to form dual free ends and a bent end;

a pliable element folded through the bent end of said wire;

the dual free ends of the doubly bent wire being threaded through the apertures of both the solid element on the side of the hook curved end and the metal bead and fixed to the metal bead such that the pliable element abuts at least one solid element, and at least one solid element and metal bead abut the shank bend.

2. The device of claim 1 wherein a plurality of solid elements having apertures therethrough are arranged on said shank midsection with the shank passing through the solid element apertures.

3. The device of claim 1 wherein said metal bead is a brass bead.

4. The device of claim 1 wherein said metal bead is fixed to said wire by solder.

5. The device of claim 1 wherein said pliable element is a length of fishing yarn.

6. The device of claim 1 wherein said pliable element is a length of maribou.

7. The device of claim 2 wherein said plurality of solid elements is a plurality of solid beads.

8. The device of claim 7 wherein said beads are of a flourescent plastic type.

9. The device of claim 7 wherein said beads are of a phosphorescent plastic type.

10. A fishing jig comprising:
a bent shank fish hook having a curved, barbed end, a straight shank midsection, a shank bend at generally right angles to said midsection and terminating in an eyelet end;

a plurality of solid elements, each having apertures therethrough and mounted on the shank midsection by means of the apertures;

a doubly bent wire, having dual free ends and having a bent end with a pliable element folded therethrough;

a metal bead, having an aperture therethrough for receiving the dual free ends of the wire, positioned next to said shank bend;

said doubly bent wire, fixed at it's dual free ends to said metal bead, and passing through the apertures in both the metal bead and the solid elements and tensioning the pliable element against the aperture of a solid element such that a portion of the pliable element is forced into the solid element aperture.

11. A method for constructing a fishing jig lure from a bent shank hook, comprising the steps of;
guiding at least one solid element with an aperture therethrough over the curved, barbed end of the hook onto the hook midsection;

folding a pliable element through the bent end of a doubly bent wire;

threading the free ends of the doubly bent wire through the solid element so that the pliable element is drawn partially within the aperture of the solid element next to the hook curved end;

threading the free ends of the doubly bent wire through an aperture in a metal bead and drawing the metal bead against the outer side of the hook shank bend such that the pliable element, solid element and metal bead are drawn together by the wire;

fixing the wire to the bead.

12. The device of claim 4 wherein the shank bend is soldered to the metal bead.

13. The method of claim 11 further comprising the steps of:
fixing the wire to the metal bead with solder;
fixing the metal bead to the shank bend with solder wicked along the wire and bead aperture.

* * * * *

UNITED STATES PATENT AND TRADEMARK OFFICE
CERTIFICATE OF CORRECTION

PATENT NO. : 4,530,180
DATED : July 23, 1985
INVENTOR(S) : Leo E. Gwazdacz, Sr. et al It is certified that error appears in the above-identified patent and that said Letters Patent is hereby corrected as shown below:

On the title page inventors should read

--(76) Inventors: Leo Gwazdacz, Sr.; Leo E. Gwazdacz, Jr. --.

Signed and Sealed this

Twelfth Day of November 1985

[SEAL]

Attest:

Attesting Officer

DONALD J. QUIGG

Commissioner of Patents and Trademarks